United States Patent
Chao

(10) Patent No.: US 6,636,432 B2
(45) Date of Patent: Oct. 21, 2003

(54) POWER CORD SECURING DEVICE FOR POWER SUPPLY APPARATUS

(75) Inventor: Po-Heng Chao, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 10/071,920

(22) Filed: Feb. 8, 2002

(65) Prior Publication Data
US 2003/0151937 A1 Aug. 14, 2003

(51) Int. Cl.[7] ................................................ H02M 1/00
(52) U.S. Cl. ..................................................... 363/146
(58) Field of Search ................................ 363/144, 145, 363/146

(56) References Cited

U.S. PATENT DOCUMENTS 5,701,244 A * 12/1997 Emmert et al. ............. 363/146
6,297,982 B1 * 10/2001 Wu ............................ 363/146
6,490,186 B2 * 12/2002 Cho ........................... 363/146

* cited by examiner

Primary Examiner—Adolf D. Berhane
(74) Attorney, Agent, or Firm—Volpe and Koenig, P.C.

(57) ABSTRACT

A power supply apparatus is provided. The power supply apparatus includes a housing, an AC inlet for accepting an AC power supply, a circuit board for converting the AC power supply into a DC power supply, a power cord for transferring the DC power supply to an electrical appliance and having a first end electrically connected to the circuit board, a first plate detachably connected to a first surface of the housing, a second plate detachably connected to a second surface of the housing, the second plate being opposite to the first plate, and a locking element disposed in the vicinity of a second end of the power cord, wherein the power cord is wound around the housing and between the first plate and the second plate so as to secure the power cord for storage.

19 Claims, 4 Drawing Sheets

POWER CORD SECURING DEVICE FOR POWER SUPPLY APPARATUS

FIELD OF THE INVENTION

The present invention relates to a power cord securing device, and more particularly to a power cord securing device for use with a power supply apparatus.

BACKGROUND OF THE INVENTION

An electronic appliance, such as a printer, a radio, a modem and a notebook, is generally equipped with an adapter for rectifying and converting the commercially available AC power supply into direct current (DC) power supply, so as to supply the required power to operate the electronic appliance.

FIG. 1 is a view illustrating an adapter of the prior art. The adapter includes a housing 11, wherein one side 111 of the housing 11 has an AC inlet 12 matching with a corresponding connector 161. The connector 161 is provided on one end of a power cable 162, while the other end of the power cable 162 is provided with a plug 163. The power adapter of FIG. 1 receives commercially available AC power supply by connecting the plug 163 to a wall socket (not shown). Another side 112 of the adapter extends a power cord 14 for transferring the DC power supply to an electronic appliance.

Since the power cord 14 has a length of from about 1 to 10 meters, a special consideration should be given to secure the power cord 14. A strap 15 is widely used to secure a bundled power cord 14 for storage. When the adapter is to be employed, the strap 15 has to be unfastened in advance and the power cord 14 can be stretched out to be connected with an electronic appliance.

However, the above-mentioned power cord securing device still has some disadvantages in practice:

1. the bundling strap 15 is readily lost, because the strap 15 is from the adapter housing 11; and
2. the bundled power cord 14 is suspended over the housing 11, which results in an inferior appearance and occupies a lot of space.

SUMMARY OF THE INVENTION

It is an object of the present invention to provide a power supply apparatus with a power cord securing device for securing a power cord between a first plate and a second plate and on a housing of a power supply apparatus, so as to overcome the problems described above.

In accordance with an aspect of the present invention, there is provided a power supply apparatus. The power supply apparatus includes a housing, an AC inlet, a circuit board, a power cord, a power cord, a first plate and a second plate. The AC inlet is used for accepting an AC power supply. The circuit board is used for converting the AC power supply into a DC power supply. The power cord is used for transferring the DC power supply to an electrical appliance and has a first end electrically connected to the circuit board. The first plate is detachably connected to a first surface of the housing. The second plate is detachably connected to a second surface of the housing. The power cord is wound around the housing and between the first plate and the second plate so as to secure the power cord for storage.

Preferably, the power supply apparatus further includes a locking element disposed in the vicinity of a second end of the power cord.

Preferably, the locking element comprises a clipper for clamping the power cord wound around the housing.

Preferably, the first plate comprises a pair of first rods.

Preferably, the interval between the pair of first rods is essentially the same as the width of the lower housing.

Preferably, each first rod has a first engaging element and a second engaging element.

Preferably, the lower housing has a third engaging element and a fourth engaging element depending on the first engaging element and the second engaging element, respectively.

Preferably, the first engaging element and the third engaging element are rectangular solids, and the first engaging element is at a level slightly over the third engaging element when the first plate is connected to the lower housing.

Preferably, the second engaging element and the fourth engaging element are respectively a slot and a tenon.

Preferably, the second plate comprises a pair of second rods.

Preferably, the interval between the pair of second rods is essentially the same as the width of the upper housing.

Preferably, wherein each second rod has a fifth engaging element and a sixth engaging element.

Preferably, the upper housing has a seventh engaging element and a eighth engaging element depending on the fifth engaging element and the sixth engaging element, respectively.

Preferably, the fifth engaging element and the seventh engaging element are rectangular solids, and the fifth engaging element is at a level slightly over the seventh engaging element when the first plate is connected to the upper housing.

Preferably, the sixth engaging element and the eighth engaging element are respectively a slot and a tenon.

In accordance with another aspect of the present invention, there is provided a power supply apparatus. The power supply apparatus includes a housing, an AC inlet for accepting an AC power supply, a circuit board for converting the AC power supply into a DC power supply, a power cord for transferring the DC power supply to an electrical appliance and having a first end electrically connected to the circuit board, a first plate detachably connected to a first surface of the housing, a second plate detachably connected to a second surface of the housing, the second plate being opposite to the first plate, and a locking element disposed in the vicinity of a second end of the power cord, wherein the power cord is wound around the housing and between the first plate and the second plate so as to secure the power cord for storage.

Preferably, the locking element comprises a clipper for clamping the power cord wound around the housing.

In accordance with another aspect of the present invention, there is provided an adapter. The adapter includes a housing, an AC inlet for accepting an AC power supply, a circuit board for converting the AC power supply into a DC power supply, a power cord for transferring the DC power supply to an electrical appliance and having a first end electrically connected to the circuit board, a first plate detachably connected to a first surface of the housing, a second plate detachably connected to a second surface of the housing, the second plate being opposite to the first plate, and a locking element disposed in the vicinity of a second end of the power cord, wherein the power cord is wound around the housing and between the first plate and the second plate so as to secure the power cord for storage.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
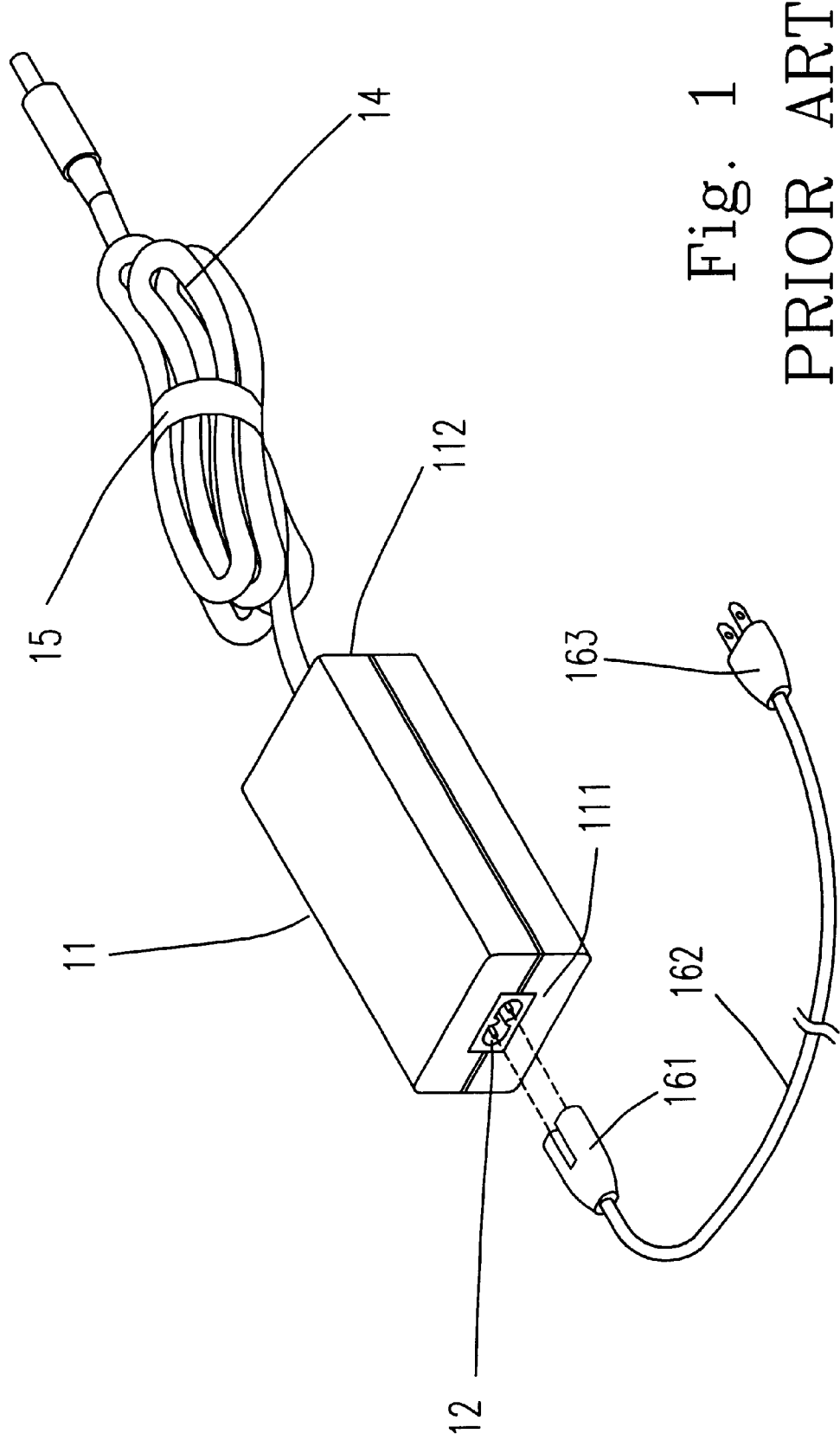
FIG. 1 is a perspective view showing a power cord securing device for an adapter according to the prior art.
Figure 2:
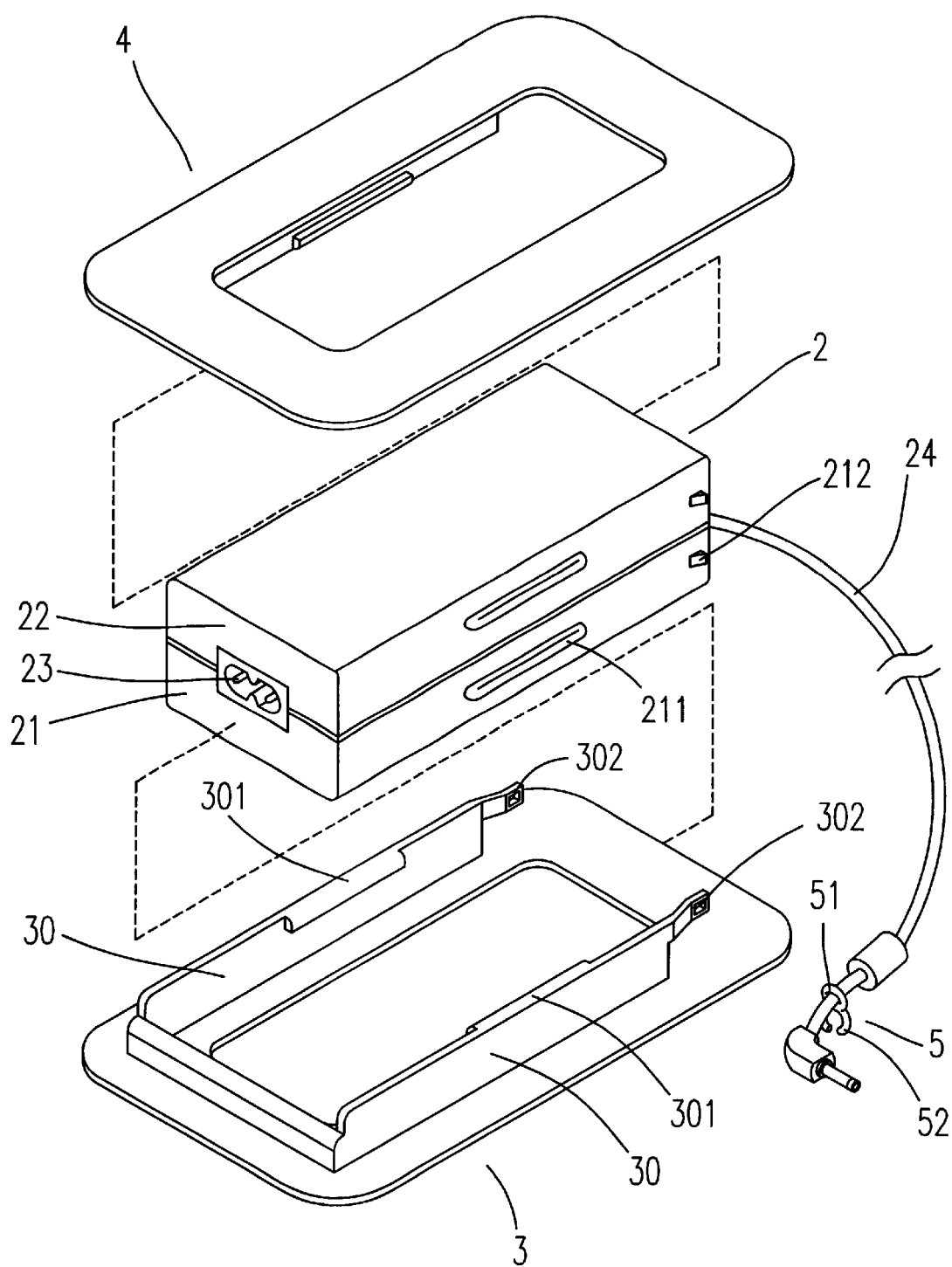
FIG. 2 is an exploded view of a power supply apparatus with a power cord securing device according to a preferred embodiment of the present invention.
Figure 3:
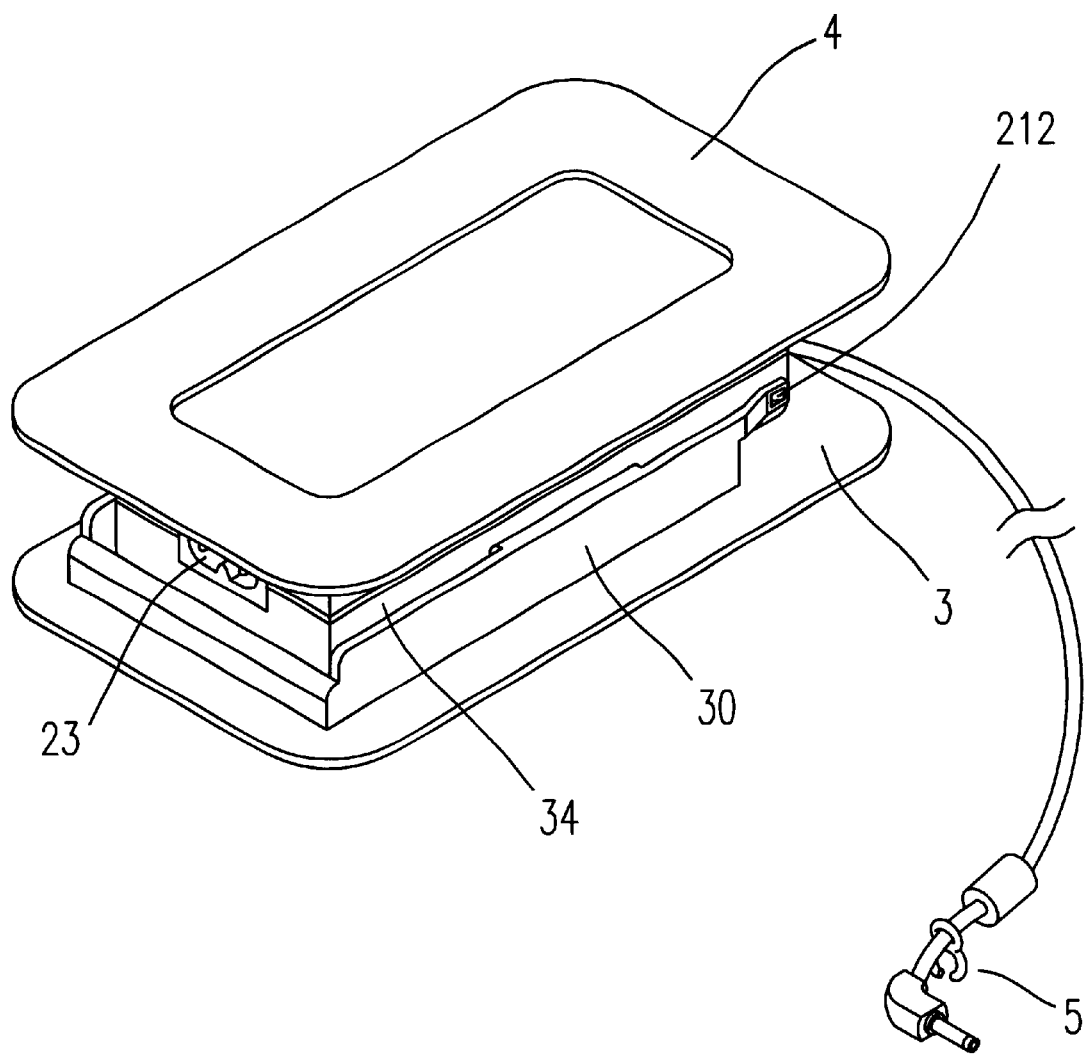
FIG. 3 is a perspective view of the power supply apparatus in FIG. 2, wherein the power cord is not secured.

Please refer to FIGS. 2 and 3. The power supply apparatus of the present invention principally includes a lower housing 21, an upper housing 22, an AC inlet 23 and a power cord 24. The AC inlet 23 is employed for accepting an AC power supply. A circuit board (not shown) is disposed within the space between the lower housing 21 and an upper housing 22 for converting the AC power supply into a DC power supply. The power cord 24 has one end electrically connected to the circuit board via an opening (not shown) on the housing. The operation and principle of the circuit board are well known in the art and need not be further described in details herein.

The power cord securing device of the present invention includes a first plate 3, a second plate 4 and a locking element 5. The first plate 3 and the second plate 4 are detachably connected the lower housing 21 and the upper side 22, respectively, at two opposite surfaces. The region between the first plate 3, the second plate 4, the lower housing 21 and the upper housing 22 is referred to a securing region 34 hereinafter.

The first plate 3 further has a pair of rods 30, wherein the interval between the pair of rods is essentially the same as the width of the lower housing 21. Each rod 30 has a first engaging element 301 and a second engaging element 302. Depending on the first engaging element 301 and the second engaging element 302, the lower housing having a third engaging element 211 and a fourth engaging element 212, respectively. In this embodiment, the first engaging element 301 and the third engaging element 211 are rectangular solids. The first engaging element 301 is at a level slightly over the third engaging element 303 when the first plate 3 is connected to the lower housing 21 so as to avoid vertical detachment. The second engaging element 302 and the fourth engaging element 312 are respectively a slot and a tenon so as to avoid horizontal detachment. The arrangement and structure of the second plate 4 are essentially the same as that of the first plate 3 and need not be further described in details herein. There is further provided a locking element 5 disposed in the vicinity of a second end of power cord 24. The locking element 5 is preferably made of plastic and includes a ring 51 and a clipper 52.

Figure 4:
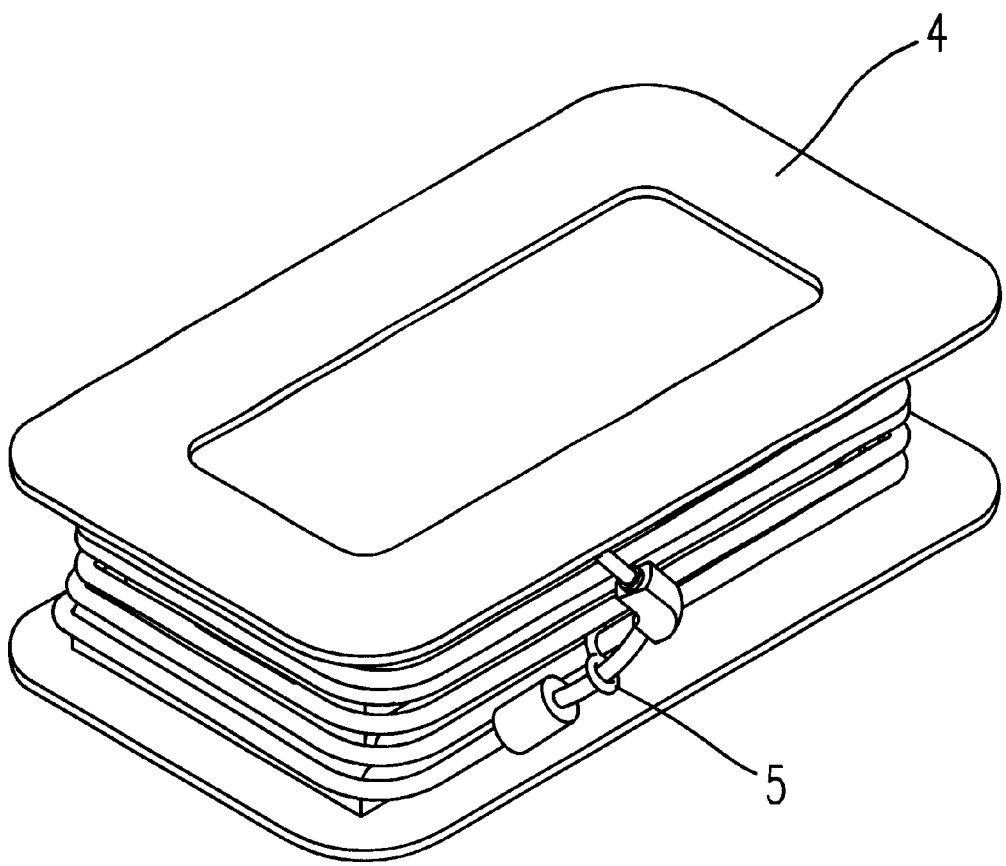
FIG. 4 is schematic diagram illustrating the power cord is secured for storage according to the present invention.

Referring to FIG. 4, the power cord is wound around the securing region 34 for storage. The locking element 5 is employed to clamp the wound power cord 24 at an appropriate position thereof so as to fix the power cord.

It is of course that the first plate 3 and the second plate 4 can be detached from the lower housing 21 and the upper housing 22 by first relieving the engagement of second engaging element 302 and the fourth engaging element 212 and then drawing out the first plate 3 and the second plate 4.

As will be apparent from the above description, the power supply apparatus of the present invention has the following advantages:

1. since the first plate 3 and the second plate 4 are detachably connected to the lower housing 21 and the upper housing 22, the power cord securing device can be optionally installed so as to increase its flexibility; and 2. since the power cord is wound around the securing region 34 of the power supply apparatus, the power cord will be no longer suspended over the housing and the problem of losing bundling strap 15 will not exist.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power cord securing device for a power supply apparatus comprising a lower housing, an upper housing, an AC inlet for accepting an AC power supply, a circuit board for converting said AC power supply into a DC power supply, and a power cord having a first end electrically connected to said circuit board for transferring said DC power supply to an electrical appliance, said power cord securing device comprising:

a first plate detachably connected to a lower surface of said lower housing; and a second plate detachably connected to an upper surface of said upper housing, said second plate being opposite to said first plate, wherein said power cord is wound around said housing between said first plate and said second plate so as to secure said power cord for storage.

2. The power supply apparatus according to claim 1 further comprising a locking element disposed in the vicinity of a second end of said power cord.

3. The power supply apparatus according to claim 2 wherein said locking element comprises a clipper for clamping said power cord wound around said housing.

4. The power supply apparatus according to claim 1 wherein said first plate comprises a pair of first rods.

5. The power supply apparatus according to claim 4 wherein the interval between said pair of first rods is essentially the same as the width of said lower housing.

6. The power supply apparatus according to claim 4 wherein each first rod has a first engaging element and a second engaging element.

7. The power supply apparatus according to claim 6 wherein said lower housing has a third engaging element and a fourth engaging element depending on said first engaging element and said second engaging element, respectively.

8. The power supply apparatus according to claim 7 wherein said first engaging element and said third engaging element are rectangular solids, and said first engaging element is at a level slightly over said third engaging element when said first plate is connected to said lower housing.

9. The power supply apparatus according to claim 7 wherein said second engaging element and said fourth engaging element are respectively a slot and a tenon.

10. The power supply apparatus according to claim 1 wherein said second plate comprises a pair of second rods.

11. The power supply apparatus according to claim 10 wherein the interval between said pair of second rods is essentially the same as the width of said upper housing.

12. The power supply apparatus according to claim 10 wherein each second rod has a fifth engaging element and a sixth engaging element.

13. The power supply apparatus according to claim 12 wherein said upper housing has a seventh engaging element and an eighth engaging element depending on said fifth engaging element and said sixth engaging element, respectively.

14. The power supply apparatus according to claim 13 wherein said fifth engaging element and said seventh engaging element are rectangular solids, and said fifth engaging element is at a level slightly under said seventh engaging element when said second plate is connected to said upper housing.

15. The power supply apparatus according to claim 13 wherein said sixth engaging element and said eighth engaging element are respectively a slot and a tenon.

16. A power cord securing device for a power supply apparatus comprising a lower housing, an upper housing, an AC inlet for accepting an AC power supply, a circuit board for converting said AC power supply into a DC power supply, and a power cord having a first end electrically connected to said circuit board for transferring said DC power supply to an electrical appliance, said power cord securing device comprising:

a first plate detachably connected to a lower surface of said lower housing;

a second plate detachably connected to an upper surface of said upper housing, said second plate being opposite to said first plate, and a locking element disposed in the vicinity of a second end of said power cord, wherein said power cord is wound around said housing between said first plate and said second plate so as to secure said power cord for storage.

17. The power supply apparatus according to claim 16 wherein said locking element comprises a clipper for clamping said power cord wound around said housing.

18. A power cord securing device for an adapter comprising a lower housing, an upper housing, an AC inlet for accepting an AC power supply, a circuit board for converting said AC power supply into a DC power supply, and a power cord having a first end electrically connected to said circuit board for transferring said DC power supply to an electrical appliance, said power cord securing device comprising:

a first plate detachably connected to a lower surface of said lower housing;

a second plate detachably connected to an upper surface of said upper housing, said second plate being opposite to said first plate, and a locking element disposed in the vicinity of a second end of said power cord, wherein said power cord is wound around said housing between said first plate and said second plate so as to secure said power cord for storage.

19. The adapter according to claim 18 wherein said locking element comprises a clipper for clamping said power cord wound around said housing.

* * * * *